(12) United States Patent
Koch

(10) Patent No.: US 8,371,085 B2
(45) Date of Patent: Feb. 12, 2013

(54) SHINGLES WITH COMBINED FASTENER TARGET ZONE AND WATER BARRIER AND PROCESS FOR PRODUCING SAME

(75) Inventor: Stephen A. Koch, Collegeville, PA (US)

(73) Assignee: CertainTeed Corporation, Valley Forge, PA (US)

( * ) Notice: Subject to any disclaimer, the term of this patent is extended or adjusted under 35 U.S.C. 154(b) by 93 days.

(21) Appl. No.: 12/578,701

(22) Filed: Oct. 14, 2009

(65) Prior Publication Data

US 2010/0192500 A1 Aug. 5, 2010

Related U.S. Application Data

(63) Continuation-in-part of application No. 12/364,842, filed on Feb. 3, 2009.

(51) Int. Cl.
*E04B 7/00* (2006.01)
*E04B 1/62* (2006.01)
*E04D 11/00* (2006.01)
*E04D 1/00* (2006.01)

(52) U.S. Cl. ............... 52/520; 52/543; 52/276; 52/557

(58) Field of Classification Search .............. 52/518, 52/520, 543, 276, DIG. 16, 57, 557, 527
See application file for complete search history.

(56) References Cited

U.S. PATENT DOCUMENTS

| | | |
|---|---|---|
| 1,108,884 A | 9/1914 | Bird |
| 1,153,418 A | 9/1915 | Bird |
| 1,184,509 A | 5/1916 | Bird |
| 1,185,509 A | 5/1916 | Bird |
| 1,547,498 A | 7/1925 | Jordan |
| 2,230,922 A | 2/1941 | Young |
| 2,253,753 A | 8/1941 | Black |
| 3,913,294 A | 10/1975 | Freiborg |
| 4,295,445 A | 10/1981 | Kopenhaver |
| 4,404,783 A | 9/1983 | Freiborg |
| 4,439,955 A | 4/1984 | Freiborg |
| 4,835,929 A | 6/1989 | Bondoc et al. |
| 4,907,499 A | 3/1990 | James |
| 5,052,162 A | 10/1991 | Bush et al. |
| 5,054,254 A | 10/1991 | Sells |
| 5,095,810 A | 3/1992 | Robinson |
| 5,109,149 A | 4/1992 | Leung |
| 5,122,095 A | 6/1992 | Wolfert |
| 5,271,201 A | 12/1993 | Noone et al. |
| 5,295,340 A | 3/1994 | Collins |
| 5,319,898 A | 6/1994 | Freiborg |
| 5,419,941 A | 5/1995 | Noone et al. |
| 5,458,538 A | 10/1995 | MacLeod et al. |
| 5,471,801 A | 12/1995 | Kupczyk et al. |
| D366,335 S | 1/1996 | Noone et al. |

(Continued)

FOREIGN PATENT DOCUMENTS

WO WO2009023038 A2 2/2009

*Primary Examiner* — William Gilbert
*Assistant Examiner* — Elizabeth A Plummer
(74) *Attorney, Agent, or Firm* — Paul & Paul

(57) ABSTRACT

A shingle, an array of shingles, and a process for producing the shingles, either of the field shingle type, or of the hip, ridge or rake type, wherein the shingles have a shortened headlap portion for purposes of reducing the amount of material necessary to make the shingle, wherein each of the shingles has a fastening zone for receiving fasteners therethrough, which fastening zone is an overlay of granule covered adhesive, and is in the headlap portion, and wherein a contact zone layer of adhesive is provided on the rear of the tab portion of the shingle, for contact against the overlay of granule covered adhesive when a next-overlying shingle is arranged in an array above a next-underlying shingle.

16 Claims, 14 Drawing Sheets

U.S. PATENT DOCUMENTS

| | | | |
|---|---|---|---|
| D366,336 S | 1/1996 | Noone et al. | |
| 5,570,556 A | 11/1996 | Wagner | |
| 5,577,361 A * | 11/1996 | Grabek, Jr. | 52/543 |
| 5,711,126 A | 1/1998 | Wells | |
| 5,772,502 A | 6/1998 | Smith | |
| 5,822,943 A * | 10/1998 | Frankoski et al. | 52/518 |
| 5,916,103 A | 6/1999 | Roberts | |
| 5,950,387 A * | 9/1999 | Stahl et al. | 52/559 |
| 5,951,809 A | 9/1999 | Jenkins et al. | |
| 5,956,913 A | 9/1999 | Nicholson | |
| 6,182,400 B1 | 2/2001 | Freiborg et al. | |
| 6,237,288 B1 | 5/2001 | Jenkins et al. | |
| 6,351,913 B1 | 3/2002 | Freiborg et al. | |
| 6,355,132 B1 | 3/2002 | Becker et al. | |
| 6,418,692 B1 | 7/2002 | Freshwater et al. | |
| 6,470,642 B1 | 10/2002 | Eads | |
| 6,482,084 B2 | 11/2002 | Hansen | |
| 6,494,010 B1 | 12/2002 | Brandon et al. | |
| 6,530,189 B2 | 3/2003 | Freshwater et al. | |
| 6,725,609 B2 | 4/2004 | Freiborg et al. | |
| 6,758,019 B2 * | 7/2004 | Kalkanoglu et al. | 52/553 |
| 6,874,289 B2 | 4/2005 | Koch et al. | |
| 7,178,294 B2 | 2/2007 | Jolitz | |
| 7,578,108 B2 * | 8/2009 | Swanson | 52/540 |
| 2002/0000068 A1 | 1/2002 | Freiborg et al. | |
| 2002/0078651 A1 | 6/2002 | Freshwater et al. | |
| 2003/0077999 A1 | 4/2003 | Mankowski | |
| 2003/0196389 A1 | 10/2003 | Naipawer, III | |
| 2004/0221536 A1 | 11/2004 | Kalkanoglu et al. | |
| 2004/0237428 A1 | 12/2004 | Headrick et al. | |
| 2005/0072092 A1 | 4/2005 | Williams | |
| 2005/0210806 A1 | 9/2005 | Guerra | |
| 2006/0029775 A1 | 2/2006 | MacKinnon et al. | |
| 2006/0032174 A1 * | 2/2006 | Floyd | 52/518 |
| 2006/0292979 A1 | 12/2006 | Stearns | |
| 2007/0042158 A1 * | 2/2007 | Belt et al. | 428/143 |
| 2007/0266665 A1 | 11/2007 | Todd et al. | |
| 2009/0038257 A1 | 2/2009 | Todd et al. | |
| 2009/0139175 A1 * | 6/2009 | Todd et al. | 52/557 |
| 2010/0218433 A1 * | 9/2010 | Quaranta et al. | 52/57 |
| 2011/0061326 A1 * | 3/2011 | Jenkins | 52/518 |
| 2011/0197534 A1 * | 8/2011 | Belt et al. | 52/520 |

* cited by examiner

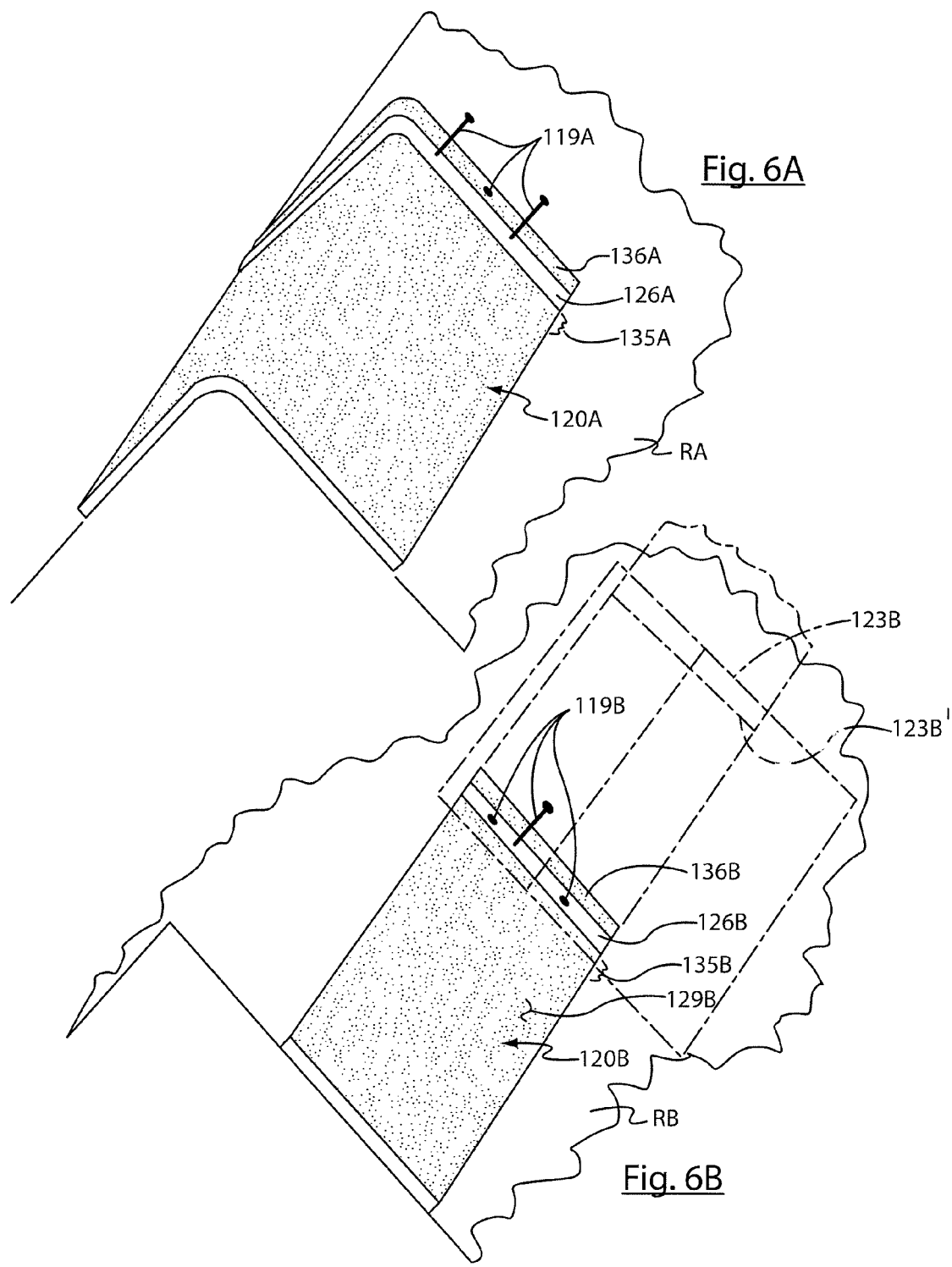

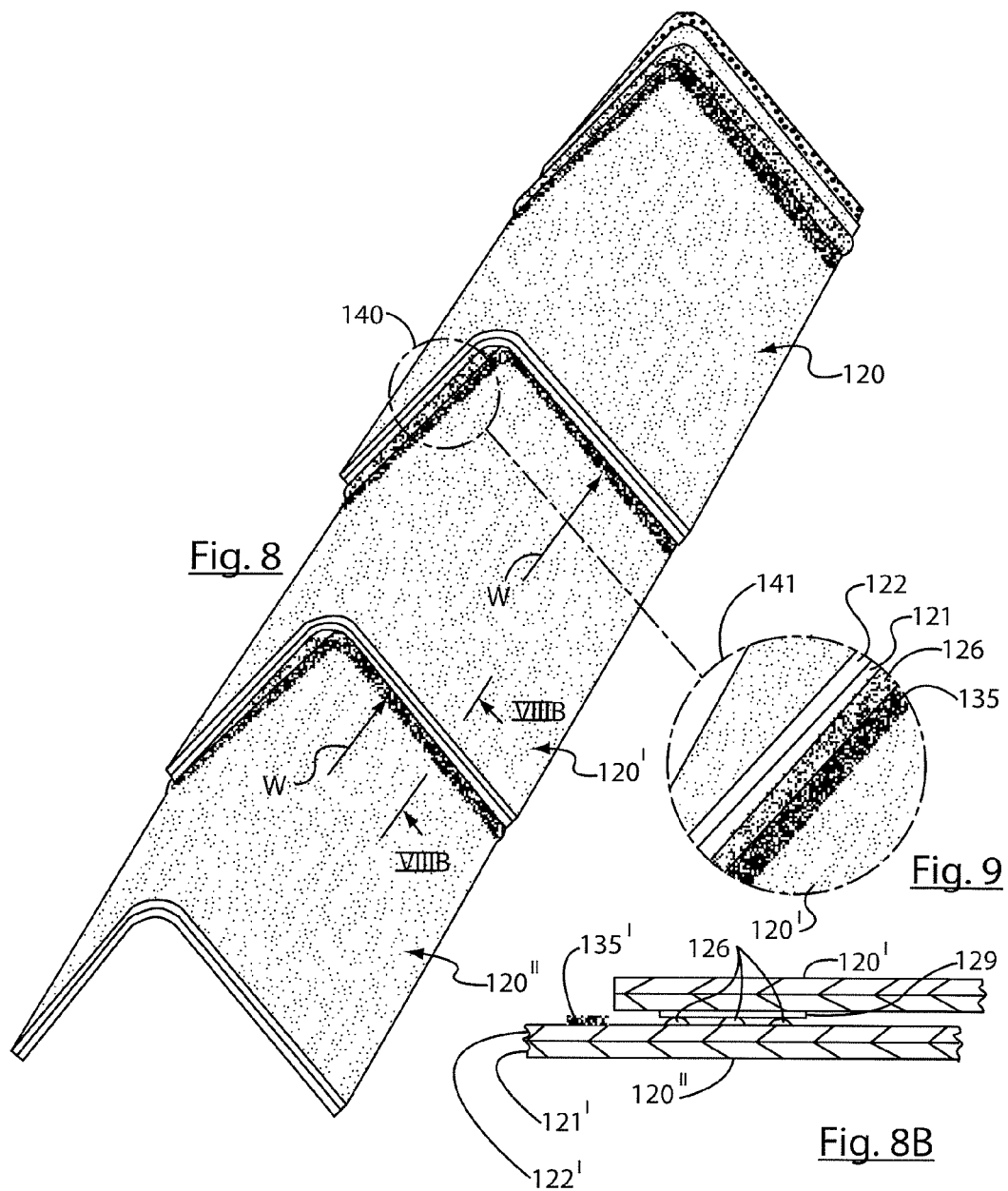

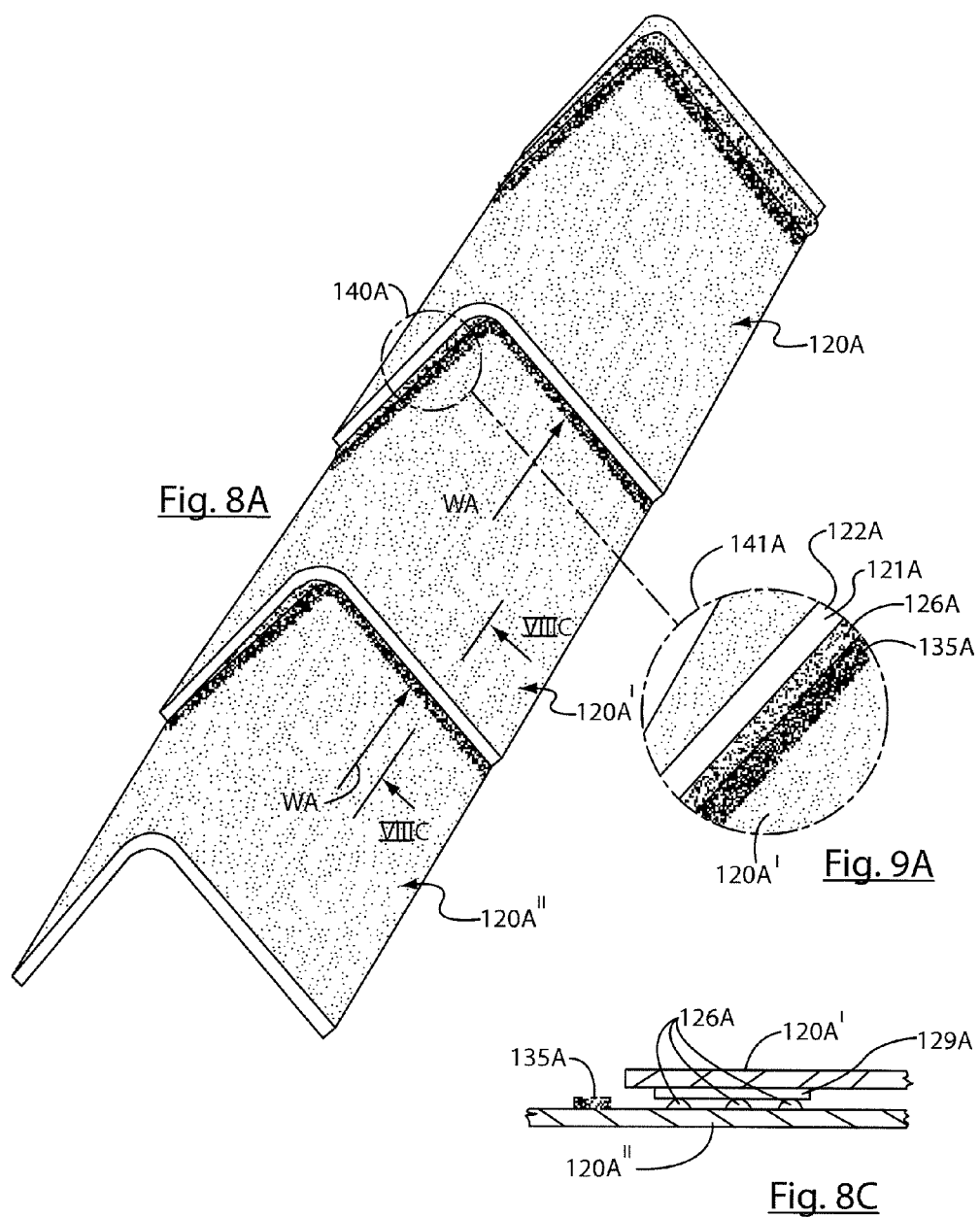

SHINGLES WITH COMBINED FASTENER TARGET ZONE AND WATER BARRIER AND PROCESS FOR PRODUCING SAME

CROSS-REFERENCE TO RELATED APPLICATIONS

This is a continuation-in-part of U.S. patent application Ser. No. 12/364,842 filed Feb. 3, 2009, the complete disclosure of which is herein incorporated by reference.

BACKGROUND OF THE INVENTION

In the shingle art, it is known to cover roofs with field shingles and to cover hips, ridges and rakes of a roof with shingles.

In the past, when a roof was being shingled with multiple-tab shingles, it was common to cut or tear a single tab of a multiple-tab shingle, severing the same from the rest of the shingle, and to then use that cut-away tab as a hip, ridge, or rake shingle.

However, as demand for different aesthetic effects became popular, wherein laminated shingles having different aesthetic effects became more popular, it became desirable to have the hip, ridge, or rake shingles be consistent with the same aesthetics as the shingles covering the rest of the roof. Such laminated shingles of the hip, ridge or rake type are shown for example in U.S. Pat. Des. 366,336; U.S. Pat. Nos. 4,835,929 and 6,494,010.

SUMMARY OF THE INVENTION

The present invention is directed to a field shingle or a hip, ridge or rake shingle, wherein the shingle has a thickened overlay portion in the headlap and which is unexposed in the installed condition of such shingle on a roof, wherein the overlay portion is a target zone for applying the shingle to a roof with fasteners, and can also be a water barrier against water entering between overlying and next-underlying shingles on a roof.

It is thus an object of this invention to provide shingles as described immediately above, as well as a novel process for producing such shingles.

It is a further object of this invention to achieve the above object, wherein an overlay strip is provided on an upper, unexposed surface of the shingle, with the overlay being comprised of an overlay adhesive with overlay granules adhered thereto.

It is a further object of this invention to provide an indefinite length of fibrous sheet having different portions that comprise an anterior layer of shingle material and other portions comprising a posterior layer of shingle material, and wherein the layers of shingle material are laminated and then transversely cut to produce at least a pair of laminated shingles, substantially simultaneously, side-by-side as the laminated layers of shingle material are advanced longitudinally.

It is a further object of this invention to accomplish the above object, wherein a plurality of overlay strips of adhesive and granules are provided on the anterior layer of shingle material, as the length of fibrous sheet moves in a longitudinal direction.

It is a further object of this invention to provide an indefinite length of fibrous sheet having different portions that comprise a single layer of shingle material, which portions are transversely cut to produce a plurality of single layer shingles, substantially simultaneously, side-by-side as the layer of shingle material is advanced longitudinally.

It is another object of this invention to produce shingles in accordance with the objects above, wherein at least one shadow line is provided, for ornamental or aesthetic effect near an edge of the shingle.

It is a further object of this invention to provide stacks of shingles in accordance with the objects set forth above.

Other objects and advantages of the present invention will be readily understood upon a reading of the following brief descriptions of the drawing figures, the detailed descriptions of the preferred embodiments, and the appended claims.

BRIEF DESCRIPTION OF THE DRAWING FIGURES

FIG. 1A is a schematic top plan view of a continuation of the shingle process illustrated in FIG. 1.

FIG. 2A is a schematic front elevational view of the portion of the shingle process illustrated in FIG. 1A, taken generally along the line IIA-IIA of FIG. 1A.

Figure 3:
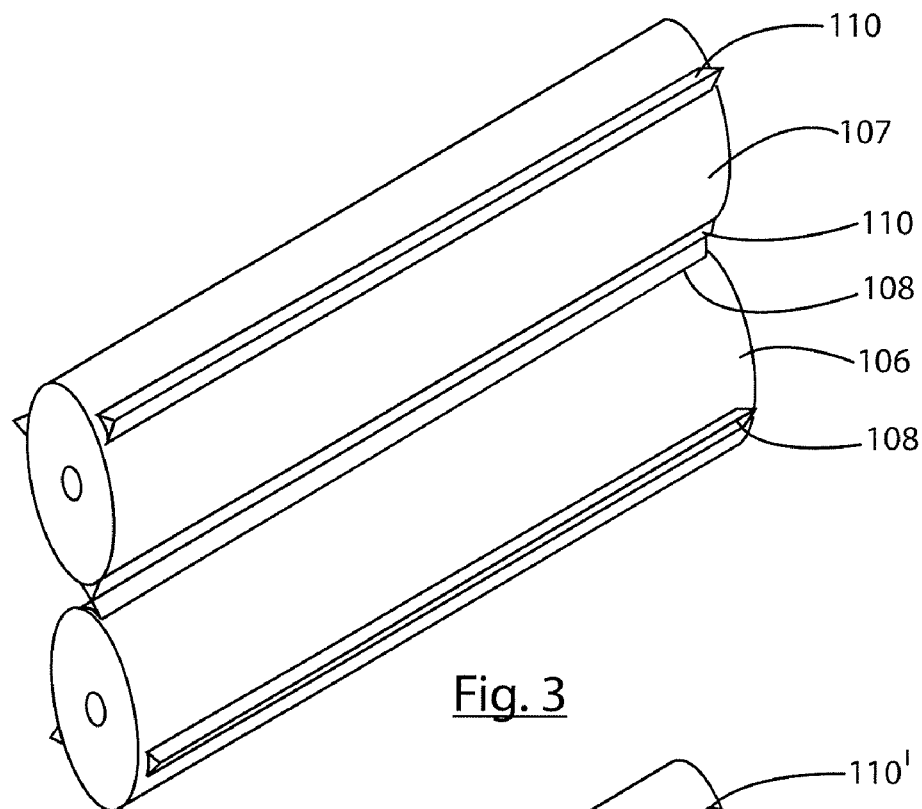
FIG. 3 is a perspective view of a pair of opposed rollers having transverse cutters thereon, for transversely cutting layers of shingle material.
Figure 4:
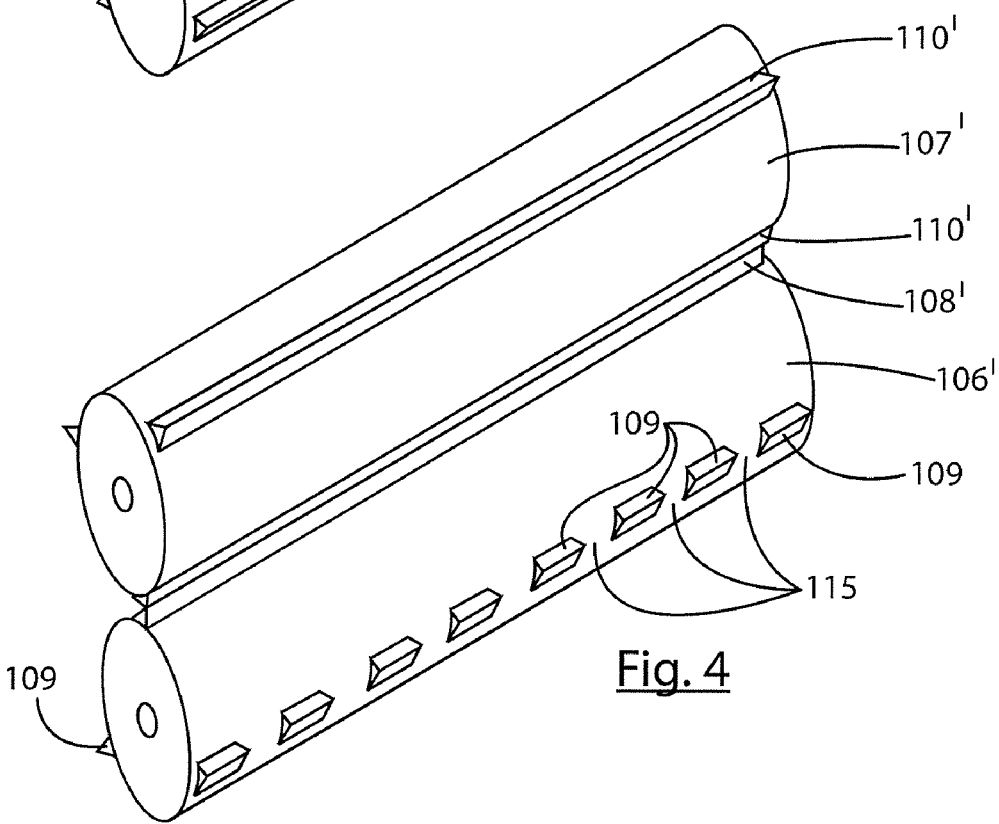
FIG. 4 is an illustration similar to that of FIG. 3, but wherein one of the rollers has spaced-apart cutters, for incompletely severing some of the shingle material being cut thereby.
Figure 4A:
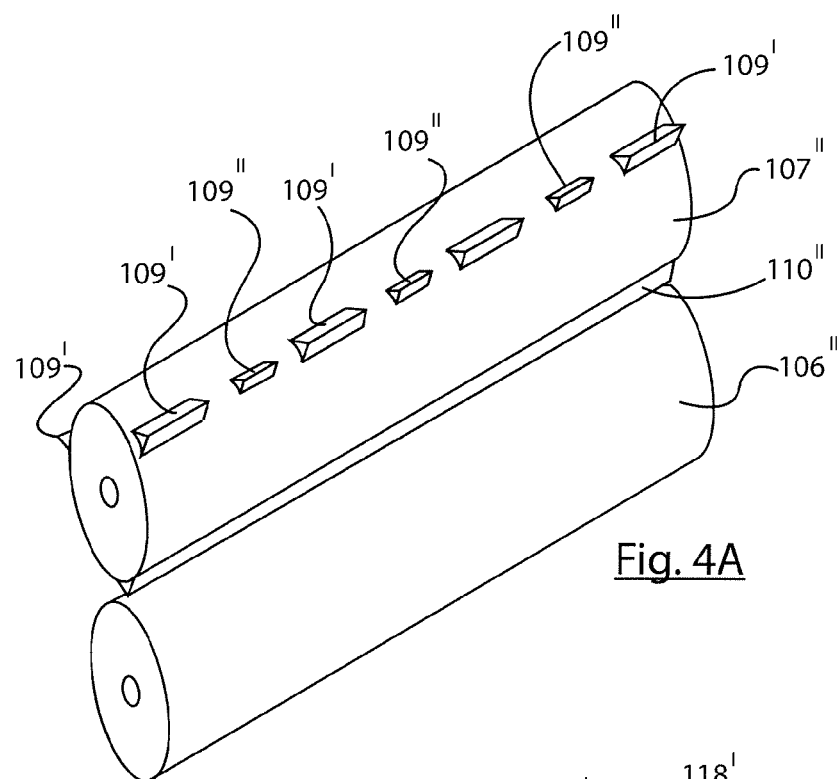

FIG. 4A is an illustration somewhat similar to those of FIGS. 3 and 4, but wherein the upper roller includes sets of blades of different depth, whereby, along the length of the upper roller, some blades can cut through a shingle, such as a laminated shingle, through a plurality of layers, and other blades are of a shallower depth to only cut through a single layer of the laminated layers, and wherein the opposing roller is of the anvil type.

Figure 5:
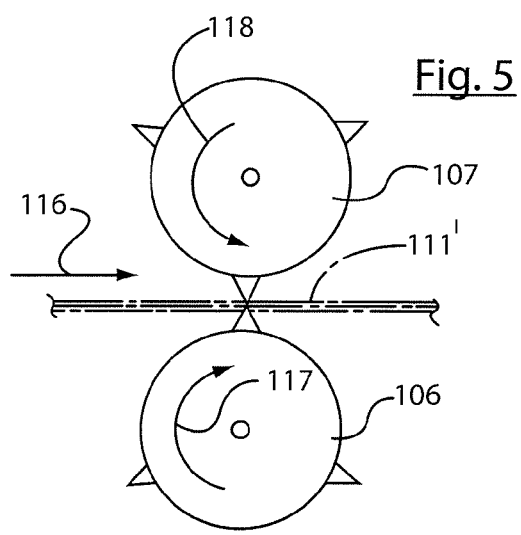

FIG. 5 is an end view of each of the pairs of rollers of FIGS. 3 and 4, illustrating the manner in which such cutters engage laminated shingle material (shown in phantom) therebetween.

Figure 5A:
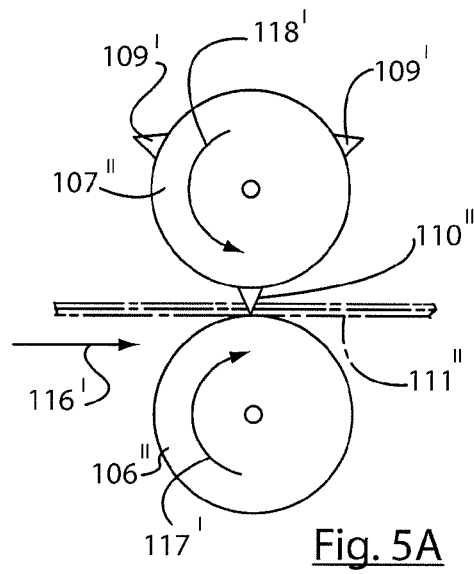

FIG. 5A is an illustration similar to that of FIG. 5, but wherein the lower roller is an anvil roller.

Figure 6:
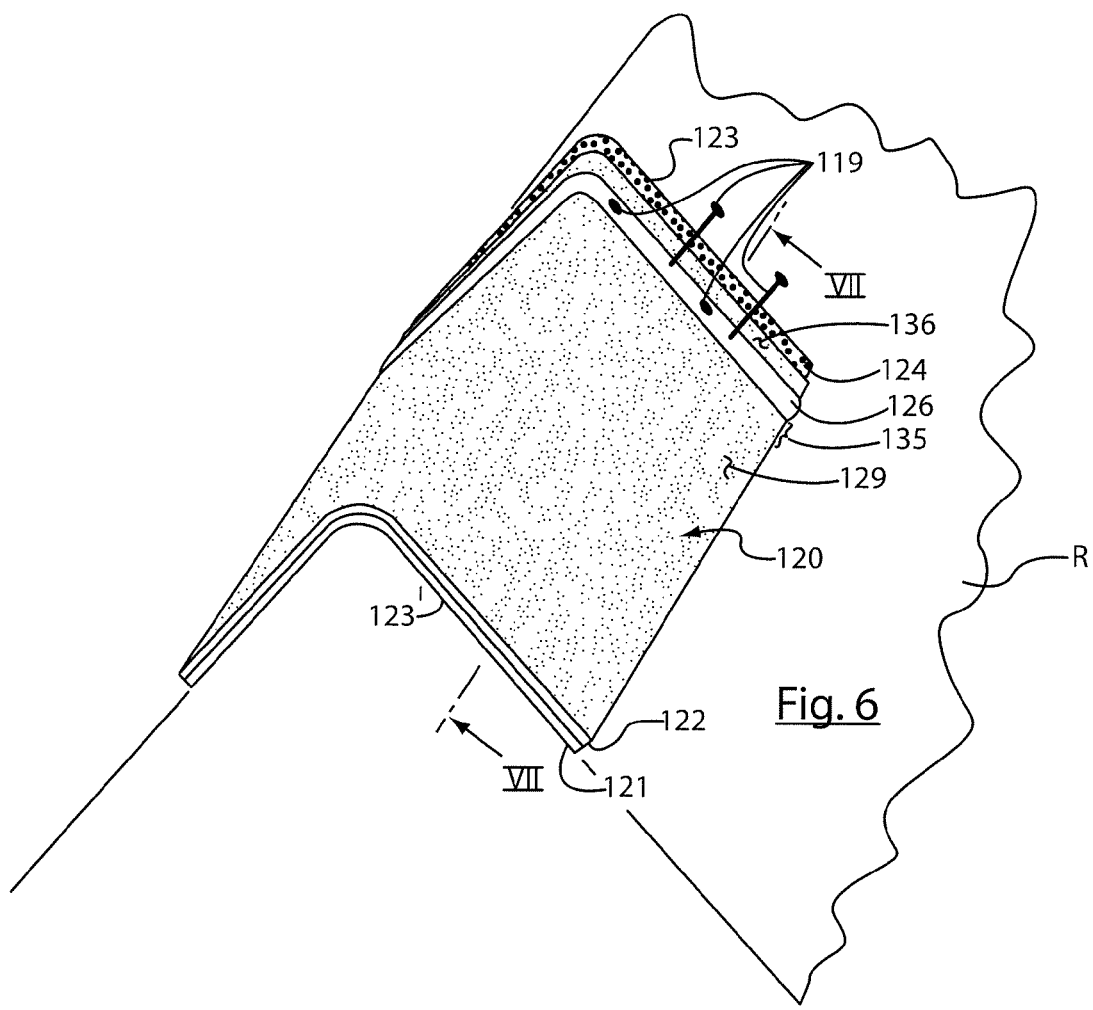

FIG. 6 is a fragmentary top perspective view of a bent hip, ridge, or rake shingle, in accordance with this invention, being nailed to a roof.

FIG. 6A is a fragmentary top perspective view of a bent hip, ridge or rake shingle, in accordance with this invention being nailed to a roof, wherein the shingle is a single thickness layer.

FIG. 6B is a top perspective view of a field shingle, in accordance with this invention being nailed to a roof, wherein the shingle is a single thickness shingle and with shingles in superadjacent courses being shown in phantom.

Figure 6C:
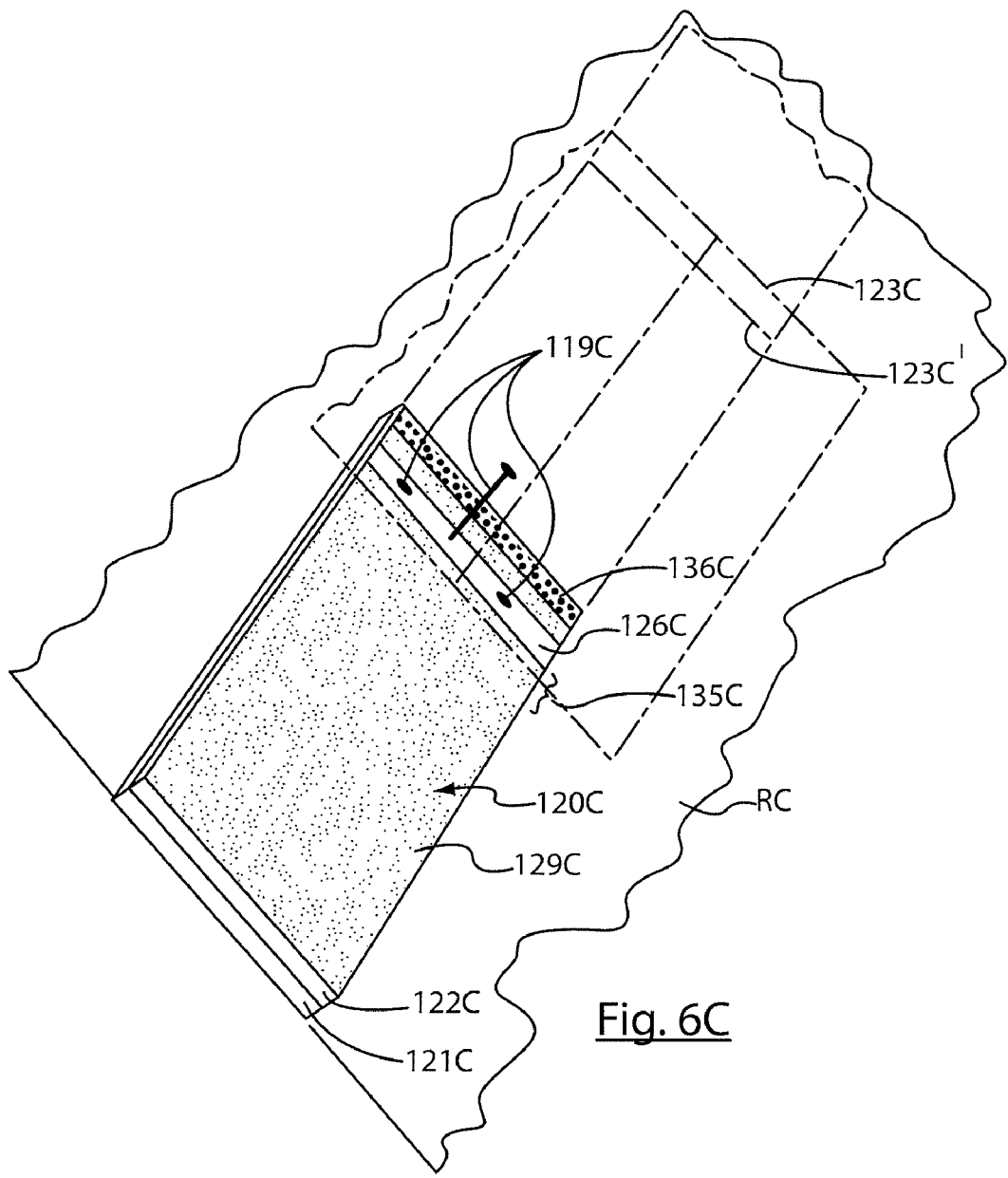

FIG. 6C is a top perspective view of a field shingle, in accordance with this invention being nailed to a roof, wherein the shingle is a multi-layer laminated shingle and with shingles in superadjacent courses being shown in phantom.

Figure 7:
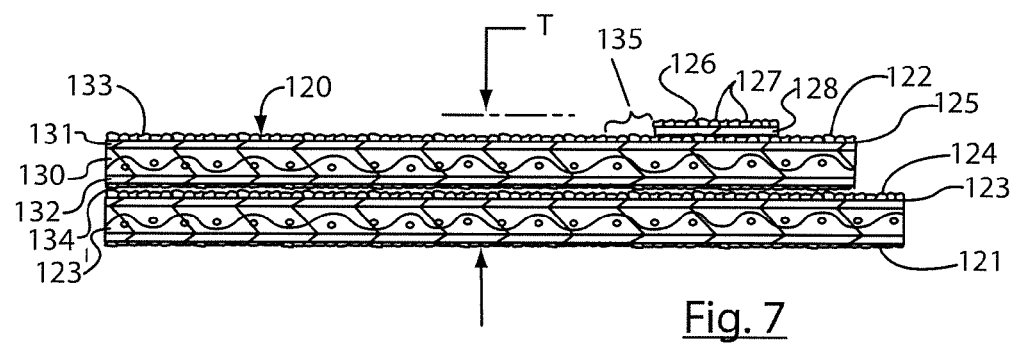

FIG. 7 is a sectional view, taken through the shingle of FIG. 6, generally along the line VII-VII of FIG. 6.

FIG. 8 is a top perspective view of an array of hip, ridge, or rake shingles in accordance with this invention, as they would appear in the installed condition on a roof.

FIG. 8A is a top perspective view of an array of hip, ridge or rake shingles in accordance with this invention, as they would appear in the installed condition on a roof, but wherein the shingles are single thickness shingles.

FIG. 8B is a fragmentary sectional view taken along the line VIIIB-VIIIB of FIG. 8, wherein an optional plurality of bands of overlay are provided, having an adhesive thereover, sandwiched between the shingles 120A' and 120A".

FIG. 8C is a fragmentary sectional view taken along the line VIIIC-VIIIC of FIG. 8A, wherein an optional plurality of bands of overlay are provided, having an adhesive thereover, sandwiched between the shingles 120' and 120".

FIG. 9 is an enlarged detail view of a portion of FIG. 8, showing the details thereof in greater clarity.

FIG. 9A is an enlarged detail view of a portion of the shingle of FIG. 8A, showing the details in greater clarity.

Figure 10:
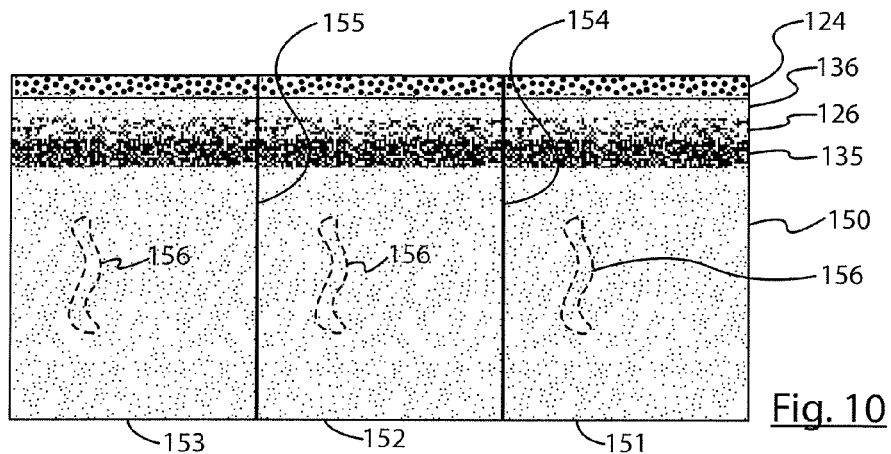

FIG. 10 is a top plan view of three connected-together single layer or laminated field or hip, ridge or rake shingles, in accordance with this invention, prior to their final separation, and wherein a continuous overlay comprised of adhesive and granules imbedded therein is shown across the three shingles of FIG. 10, with a shadow band therebeneath, all adjacent an upper edge of the group of three shingles of FIG. 10, with, in the case of laminated shingles, each of the shingles having a portion of laminating adhesive shown in phantom, connecting the laminated layers together.

Figure 11:
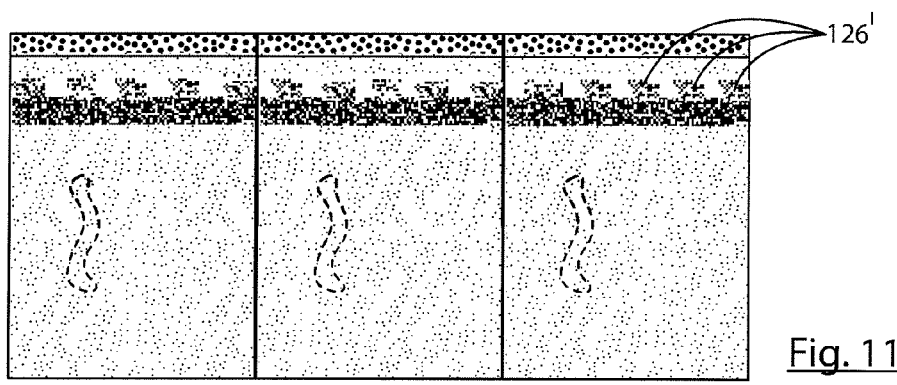

FIG. 11 is an illustration like that of FIG. 10, but wherein the overlay strip is discontinuous, in the form of longitudinally spaced-apart overlays.

Figure 12:
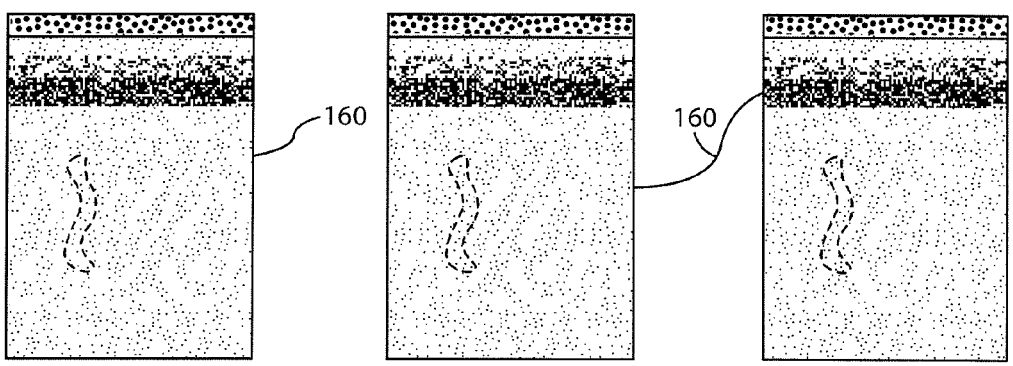

FIG. 12 is an illustration of the shingles of FIG. 10, after their separation.

Figure 13:
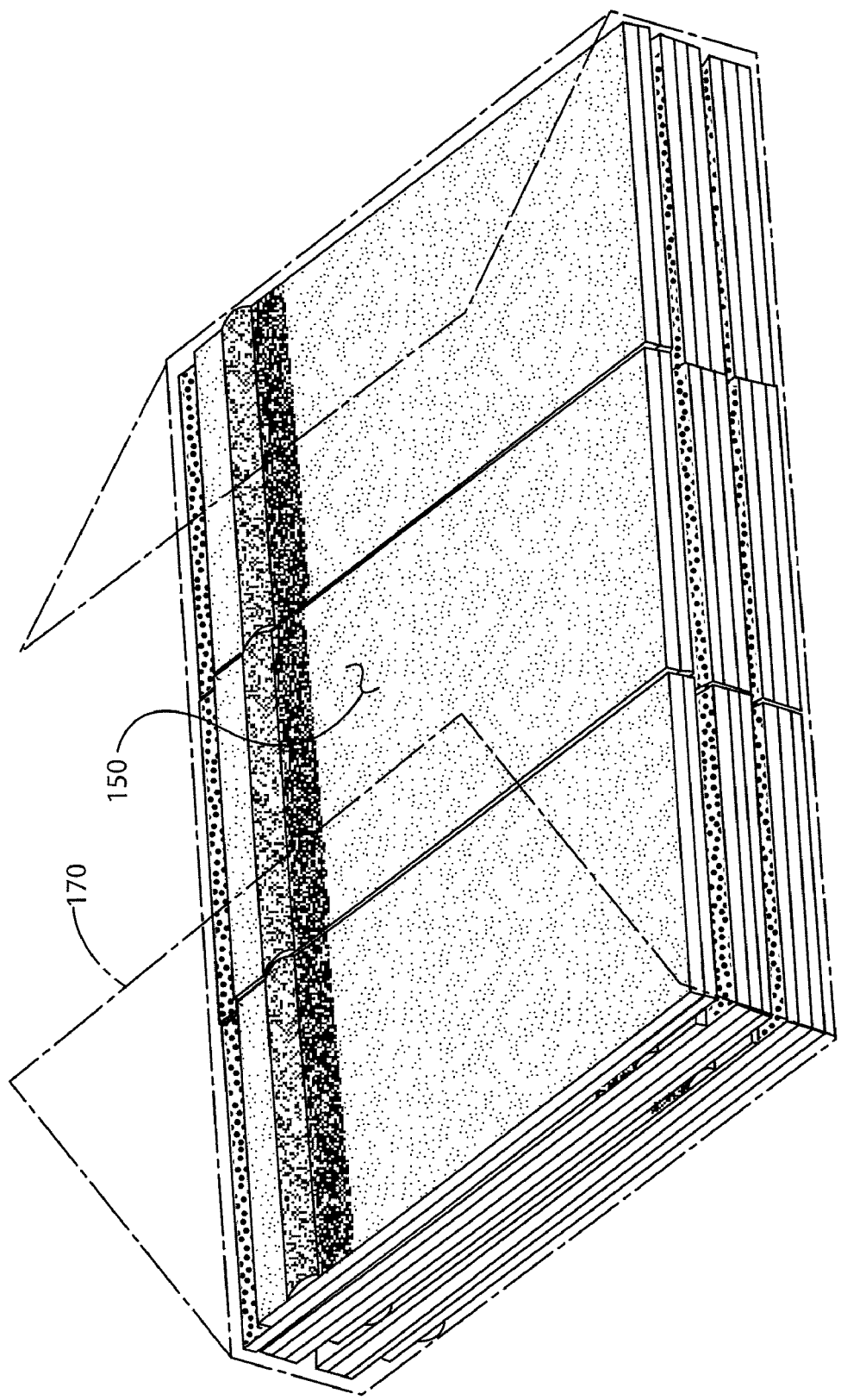

FIG. 13 is a stack of shingles of the type of FIG. 10, shown with wrapping material being applied thereto, in phantom, for wrapping the stack of shingles into a package.

Figure 14:
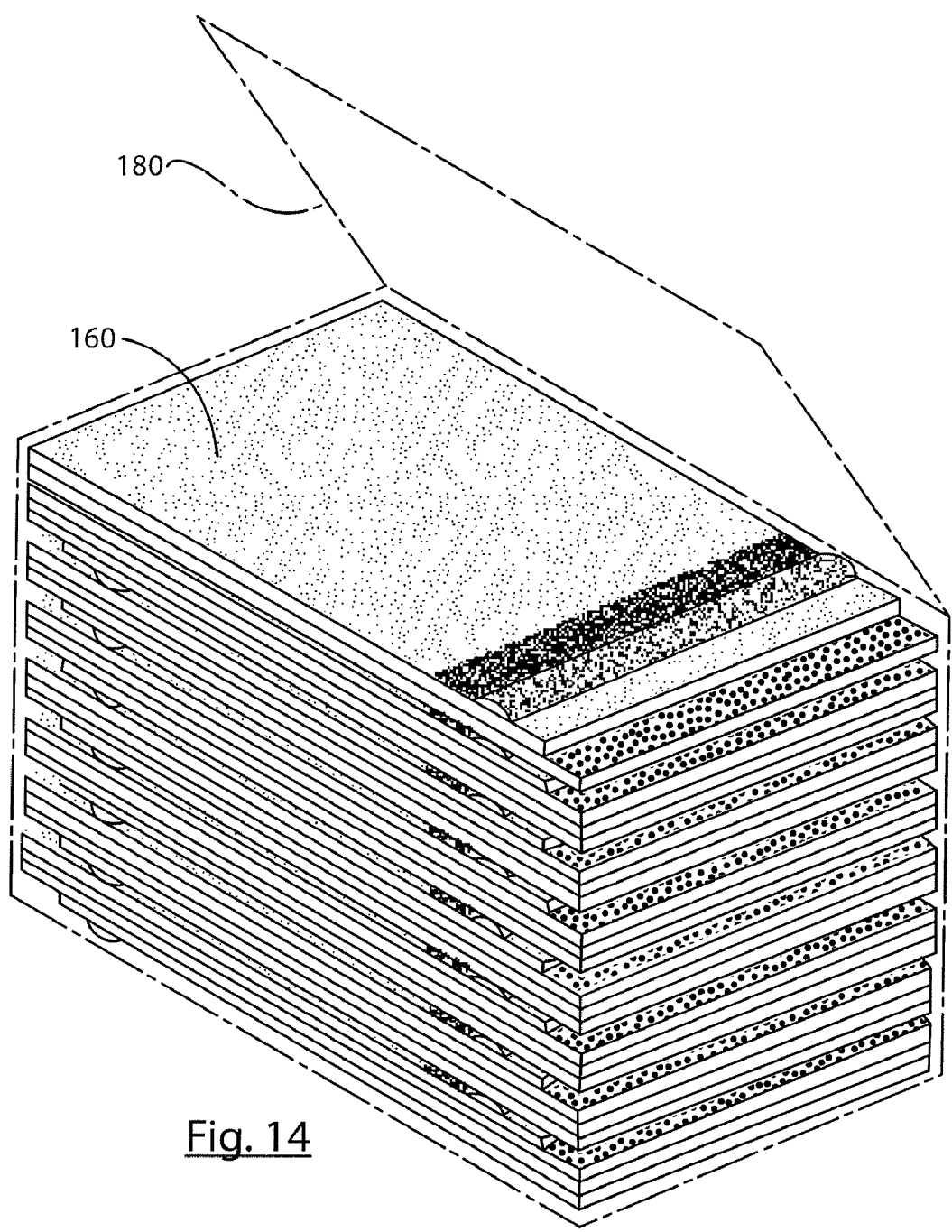

FIG. 14 is an illustration similar to that of FIG. 13, but for the separated shingles of FIG. 12.

Figure 15:
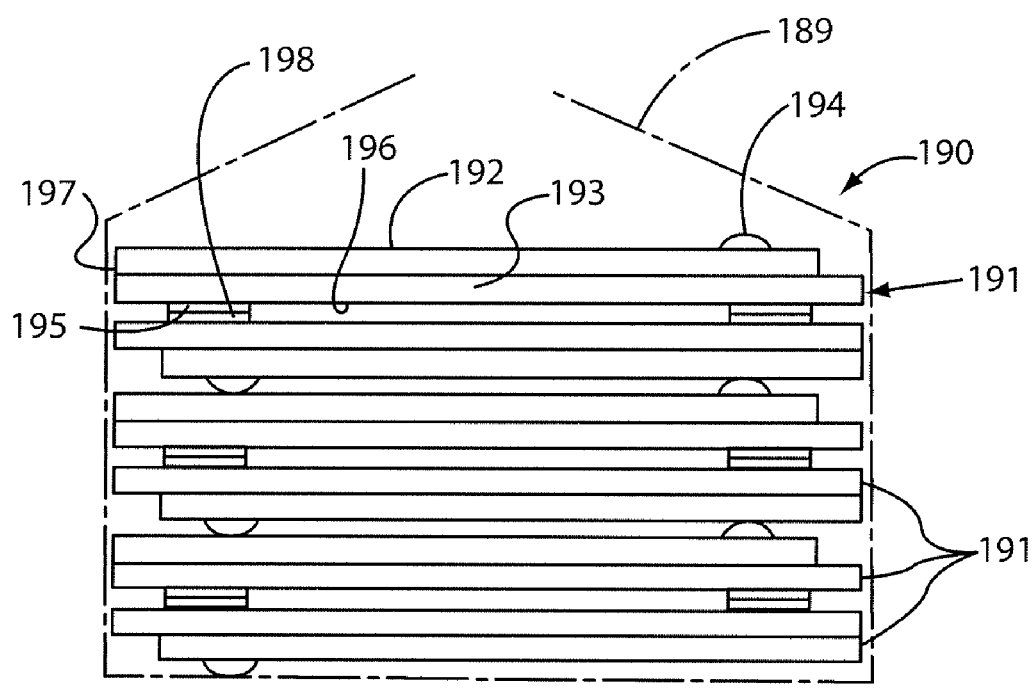

FIG. 15 is a side elevational view of shingles of the type illustrated in FIGS. 13 and 14, packaged together, but wherein adjacent shingles are packaged back-to-back, showing adhesive strips on the back of each laminated shingle, covered by a release strip of a next-adjacent shingle, and wherein the packaging for the shingles of FIG. 15 is illustrated in phantom.

Figure 15A:
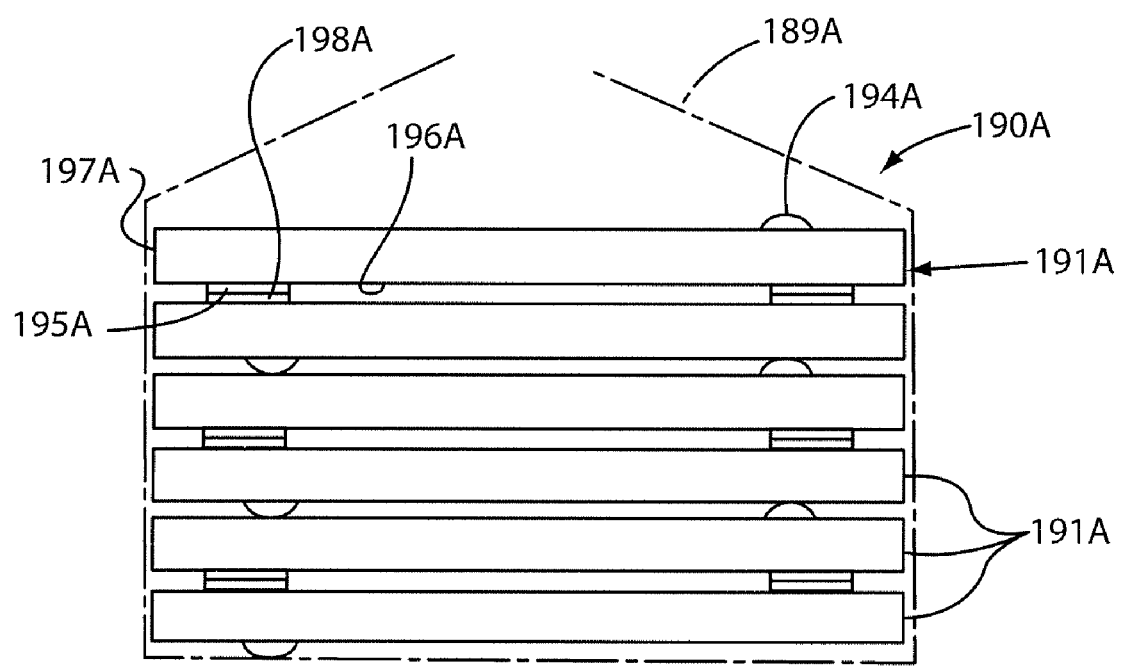

FIG. 15A is an illustration similar to that of FIG. 15, but wherein the shingles in the stack are single layer shingles.

DETAILED DESCRIPTIONS OF THE PREFERRED EMBODIMENTS

Figure 1:
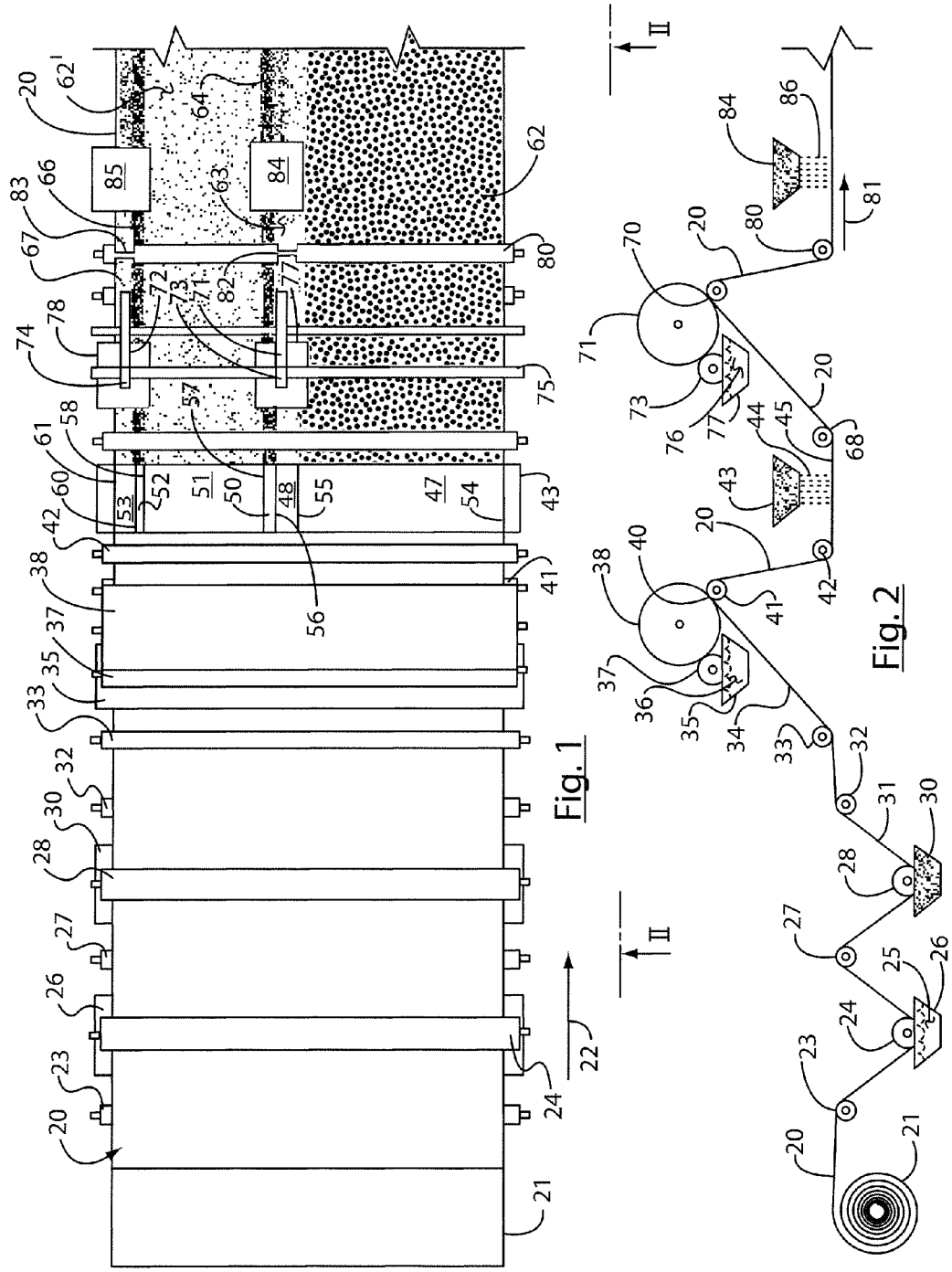
FIG. 1 is a schematic top plan view of a portion of the shingle process in accordance with this invention.
Figure 2:
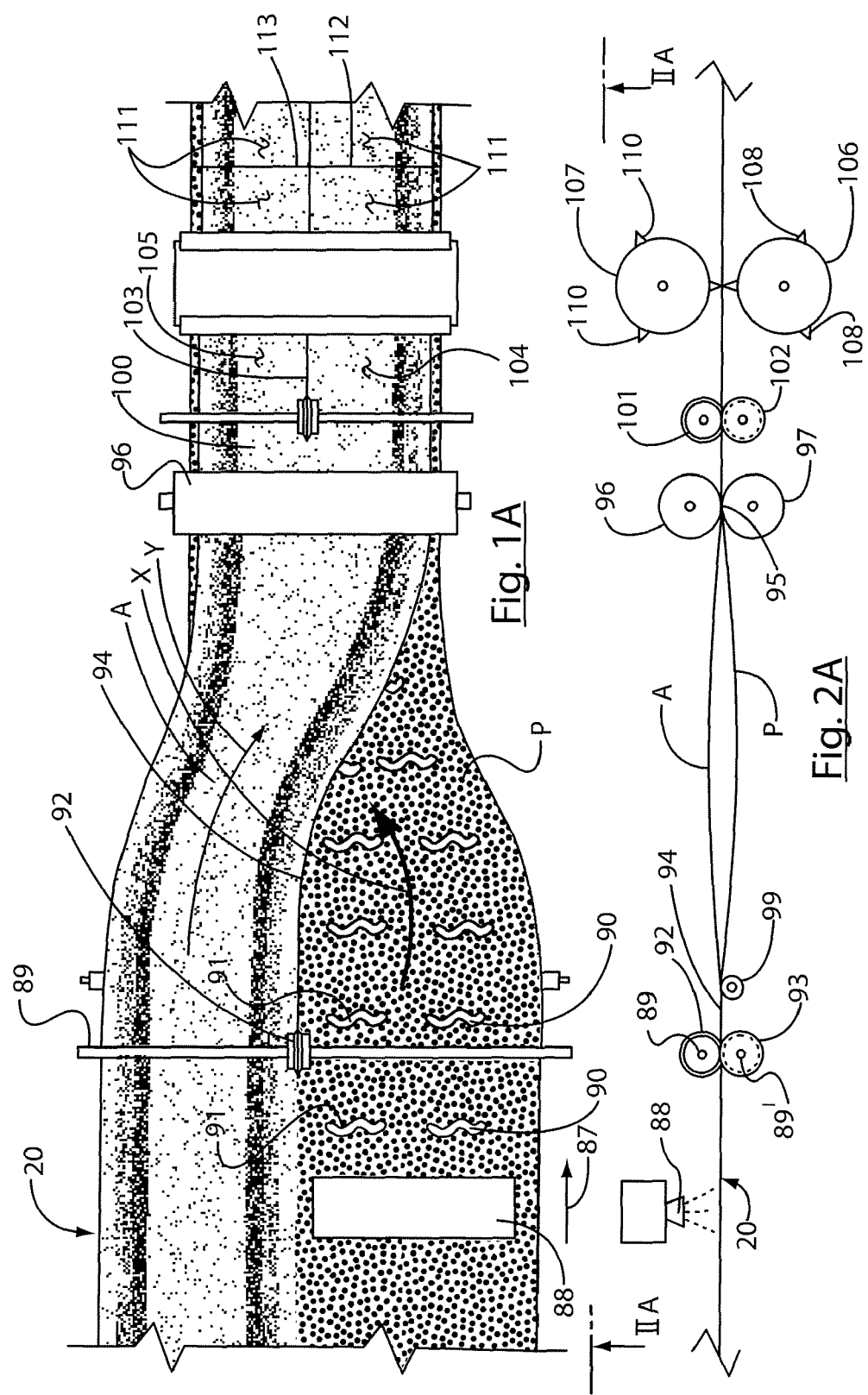
FIG. 2 is a schematic front elevational view of the portion of the shingle process illustrated in FIG. 1, taken along the line II-II of FIG. 1.

Referring now to the drawings in detail, reference is first made to FIGS. 1 and 2. A sheet 20 comprising an indefinite length of fibrous material, such as organic or inorganic mat, is provided, which may or may not be provided in the form of a roll 21, and which is impregnated or will become impregnated with a preferably bituminous material such as asphalt. The mat 20, as it travels in its longitudinal path 22, may pass over a roller 23, to pass beneath another transverse roller 24 to impregnate at least the lower surface of the fibrous sheet 20 with an adhesive 25, that also will preferably be a bituminous material such as asphalt, from a transverse tank 26, with the fibrous sheet 20 then passing over another transverse roller 27, to be delivered beneath another roller 28, disposed in a particle application trough 30, or the like, for adherence of tiny granule particles such as sand, mica, or the like to the undersurface 31 of the fibrous sheet 20.

It will be understood that other techniques for applying an adhesive to the fibrous sheet 20 may be employed, such as by running the sheet 20 through a bath of adhesive, that, again, will preferably be of a bituminous material such as asphalt. Similarly, other techniques for applying tiny granules such as sand, mica or the like to the undersurface 31 of the fibrous sheet 20 may likewise be employed, as alternatives. As a further alternative, the tiny granules could be applied at a different time, for example, at a later time.

The fibrous sheet 20 may then pass over and under another series of rollers 32, 33, to a location where an adhesive such as asphalt or other bituminous material is applied to the top surface 34 of the sheet 20.

In the embodiment of FIGS. 1 and 2, such adhesive is applied from a transverse adhesive trough 35 by applying the adhesive 36 to a roller 37 arranged in the trough 35, which, in turn, applies the adhesive to another, larger roller 38, which applies the adhesive as the upper surface 34 as the fibrous sheet 20 passes through the nip 40 between the large roller 38 and another roller 41.

The thus impregnated sheet 20 then passes around another transverse roller 42 before traveling beneath a granule applicator 43, for deposit of granules 44 on an upper surface 45 of the sheet 20.

The granule applicator 43 is divided into six application zones 47, 48, 50, 51, 52 and 53, separated by walls 54, 55, 56, 57, 58, 60 and 61.

Granules from zone 47 are preferably post-industrial granules or lower cost or scrap granules or recycled granules and are shown as dark granules and are deposited in a wide longitudinal band 62, shown at the lower right of FIG. 1, from between walls 54 and 55 of granule applicator 43. The band 62 of darker granules will thus be on the front surface of the posterior shingle layer after longitudinal cutting and lamination of the anterior and posterior shingle layers together, as will be discussed hereinafter.

Granules from zone 48, between walls 55 and 56, are shown as lighter colored granules, but, because they will be covered in the installed condition, could be granules like those from zone 47. The granules from zone 48 are deposited in a longitudinal band 63, on a portion of the sheet 20 that will form a component of an anterior shingle layer.

Preferably dark granules will be deposited from zone 50 between walls 56 and 57, to form a longitudinal shadow band 64.

Preferably lighter granules are deposited from zone 51 of the granule applicator 43, from between walls 57 and 58, to form a longitudinal band 62' of such lighter granules or granules of a different shade or color than those forming the band 63 on a portion of the sheet 20 that will also comprise the upper surface of an anterior shingle layer.

Another longitudinal shadow line band 66 of dark granules is formed on the upper surface of the sheet 20, from the zone 52 of the granule applicator 43 that is between walls 58 and 60, to provide another shadow band of darker granules.

Another longitudinal band of granules 67 is formed by dropping granules from the zone 53 of the granule applicator 43, between walls 60 and 61, with the longitudinal band 67 being similar to the longitudinal band 63. The granules from band 67, because they will be covered in the installed condition, could likewise be granules like those from zone 47.

After the above-discussed granules are dropped onto the upper surface of the fibrous sheet 20 as described above, from granule applicator 43, the sheet 20 passes beneath a roller 68, to be delivered to nips 70 beneath adhesive applicator rollers 71 and 72 that receive adhesive via rollers 73 and 74 carried on shaft 75. The rollers 73 and 74 are, in turn, engaged with adhesives 76 in adhesive troughs 77, 78, to apply two continuous or discontinuous parallel bands of adhesive to the upper surface of the portion of the sheet 20 that will comprise the anterior shingle layers.

The sheet 20 with the two narrow bands of adhesive applied via rollers 71 and 72, then passes beneath roller 80, as the sheet 20 moves longitudinally rightward as shown in the direction of the arrow 81 in FIG. 2.

It will be noted that the roller 80 has two necked-down portions of reduced diameter, 82 and 83, where the longitudinal strips of adhesive have been applied via rollers 71 and 72, to keep adhesive from being smeared by the surface of the roller 80, as the thin adhesive bands pass beneath the roller 80.

The sheet 20 is thus delivered beneath overlay granule applicators 84 and 85, which deposit overlay granules, preferably dark in shading, onto the thin longitudinal bands of adhesive that has been applied via adhesive applicator rollers 71 and 72, as shown at 86 at the right end of FIG. 2.

Alternatively, the sheet 20 could be routed in a different way, so that an adhesive such as that 76 is applied as contact with a roller occurs, prior to the granule application as shown at 86.

Continuing on to FIGS. 1A and 2A, the sheet 20 then continues in the longitudinal direction 87 shown in FIG. 1A, such that its portion 62, shown as darker in FIGS. 1 and 1A for visual differentiation between the layers, passes beneath an adhesive applicator 88, by means of which transversely spaced-apart adhesive zones 90, 91 are applied as the sheet 20 passes therebeneath. The adhesive zones 90, 91 are not only transversely spaced-apart, but are longitudinally spaced-apart, as shown.

The sheet 20 then passes between a pair of slitter rollers 92, 93, carried by shafts 89, 89', where the sheet 20 is longitudinally slit, with the slit continuing at 94, and with the sheet then continuing, to pass over roller 99, with the posterior sheet P being brought beneath the anterior sheet A (shown as the lighter sheet in FIG. 1A) and the two sheets P, A are laminated together by means of the adhesive zones 90, 91, pressed together by passing through the nip 95 between upper and lower rollers 96, 97. The thus laminated sheet 100 is brought together, as shown at the right end of FIG. 1. Sheet P follows the path of arrow X while sheet A follows the path of arrow Y as the sheets P, A are laminated together. The roller 93 can optionally be an anvil roller, which the blade of the roller 92 can cut against.

The laminated sheet 100 then passes beneath another pair of opposed slitter rollers 101, 102, whereby the laminated sheet is slit into two, along slit line 103, yielding transversely adjacent laminated sheets 104 and 105, as viewed at the right end of FIG. 1A. One of the rollers, such as the roller 102, for example, could be an anvil roller, against which a blade of a slitter roller 101 operates, if desired.

Alternatively, the slitter rollers 101, 102 could be carried by the shaft 89, 89', or by some other shaft (not shown) to slit the sheet 20 longitudinally upstream of the lamination step, into two parallel anterior layers and two parallel posterior layers, which would then be laminated together.

As a further alternative, the sheet 20 could be used to produce only an anterior sheet A. Such may be used if it were desired to have anterior layers only, with overlays thereon, with or without shadow bands thereon, to produce a single thickness layer of hip, ridge or rake shingle, which would still have a greater apparent thickness, due to the overlay thereon.

As a further alternative in accordance with this invention, the sheet 20 could be slit longitudinally into more than two distinct layers by means of multiple opposed slitter rollers such as those 92, 93, to yield more than two parallel layers, such that when those parallel layers are brought together and laminated, the lamination would comprise more than two laminated layers, at least one of which would have the band or bands of overlay comprised of adhesive and granules thereon.

The adjacent laminated sheets 104 and 105 then pass beneath a pair of transverse cutter rollers 106 and 107, each shown as having three transverse cutters 108, 110 disposed preferably 120° apart around rollers 106, 107, with the rollers 106, 107 being sized to cut the laminated sheets 104, 105 transversely into predetermined sizes, whenever cutters 108, 110 meet each other, to cut the laminated sheets 104, 105 into either separate longitudinally adjacent shingles 111 of desired size, or into connected-together longitudinally adjacent shingles of desired size, still connected by means of incompletely severed shingles. Alternative cutting arrangements will be discussed hereinafter.

It will be apparent throughout FIGS. 1 and 2 and throughout FIGS. 1A and 2A, that the various rollers are all shaft-mounted, and that in many cases, the rollers will be positively driven via motors or the like. However, it will likewise be understood that in many cases some of the rollers that are not actually used to longitudinally move the sheet forward in the direction of the arrow 22, for example, can be idler rollers, rather than motor-driven rollers.

Further, while the rollers are shown for cutting processes, other cutting means may be employed, such as, for example, stamping blades, water jets, laser cutters, and other cutting means known in the art.

While the illustrations of FIGS. 1, 1A, 2 and 2A illustrate an apparatus for producing a pair of laminated sheets 104 and 105, or optionally a single thickness sheet, it will be understood that such depends on the width of the machine. For example, a wider machine could produce three or four or more such sheets similar to sheets 104, 105, as alternatives.

In any event, the lines of partial or complete severance will be shown at 112, 113, and will be addressed hereinafter.

With reference now to FIG. 3, it will be seen that the rollers 106, 107 are shown together, such that their cutters 108, 110, are transversely continuous, to completely sever through both anterior and posterior shingle layers, or, in the case of single layer shingles, an anterior layer only, as the continuous laminated shingle sheet portions 104, 105 pass therebetween.

With reference to FIG. 4, the upper and lower rollers 107', 106' likewise have transversely continuous cutters 108', 110', but for the roller 106, at two of the locations around the roller that are approximately 120° spaced-apart, there are provided a plurality of discontinuous transverse cutter teeth 109. The cutter teeth 109, when used to make laminated shingles, when engaging the posterior layer of shingle material, will incompletely sever the posterior layer of shingle material, whereas the cutters 108' and 110' will completely sever the anterior and posterior layers of shingle material where they engage the shingle material, such that every third laminated shingle will be completely separated, to yield groups of three laminated shingles that are still connected together by portions of material in the posterior shingle layer that are not severed, because of the cutter-free spaces 115 between spaced-apart cutter teeth 109.

With reference now to FIG. 4A, it will be seen that the lower roller 106" is an anvil roller, not having cutters thereon. The upper roller 107" provides the cutting. In this arrangement, some of the cutting teeth 109' are larger, for cutting either completely through, or at least deeper through the shingle material passing between the rollers 106", 107", with intervening teeth 109" not protruding as much from the surface of the roller 107" as the teeth 109', such that the teeth 109" make an incomplete cut depthwise through the material passing between the rollers 106", 107". Thus, if the material passing between the rollers 106", 107" is, for example, a two layer laminate, the teeth 109' may cut completely through both layers of the laminate, with the shallower teeth 109" cutting through only one layer of the laminate, and with every third cutting area around the roller 107" having a cutting tooth 110" of sufficient depth to cut completely through both layers of, for example, a two-layer laminate, for completely severing through every third hip, ridge or rake shingle, so that multiple shingles can remain together, only partially severed, for packaging and/or transport purposes.

Alternatively, shallow teeth 109" and full cut teeth 109' could be connected to one another rather than separated as is depicted in FIG. 4A.

It will be understood that the present invention is not limited to having only three connected-together shingles, between complete separations of shingles, but rather two or four, or even a greater number of shingles could be connected together, between locations of complete transverse cuts, depending upon the number of shingles that one may desire to have connected together. Thus, the present invention allows for considerable variation in the number of shingles that can remain connected together, depending upon the sizes of packages of shingles that one might desire.

With reference now to FIG. 5, it will be seen that a sheet, for example that 111' of laminated shingle material shown in phantom, is passing between the rollers 106, 107, as the sheet 111' moves in the longitudinal direction 116 shown, with the rollers 106, 107 being oppositely rotated as shown by the arrows 117, 118.

With reference now to FIG. 5A, there is provided an end view of the rollers 106", 107" illustrated in FIG. 4A, turning in the directions of arrows 117', 118' as sheet 111" moves in the direction of arrow 116' after passing through the rollers 106", 107" and with the various cutting teeth 109' and 110" operating to cut against the surface of the roller 106", but wherein the intervening shallower teeth 109" are not shown in FIG. 5A, in that they are hidden from view in the illustration of FIG. 5A.

With respect to the illustrations of FIGS. 4A, 5 and 5A, it will be understood that the rollers and cutters shown can also be used to cut single layer shingles, such that, instead of some of the cutters cutting through a posterior layer of a laminated shingle, could cut only partially through the single, anterior layer of a sheet of material for making single layer shingles.

With reference now to FIGS. 6 and 7, a laminated hip, ridge, or rake shingle 120 is shown, as comprising a posterior shingle layer 121 and an anterior shingle layer 122. The shingle layers 121 and 122 are adhered together by means of generally one zone 90 or 91 of adhesive material (not shown in FIG. 6 or 7), in order to allow for sliding of adjacent surfaces of the posterior and anterior shingle layers 121, 122 relative to each other as the shingle 120 is bent into an inverted V shaped configuration, as shown in FIG. 6.

In FIG. 6 the shingle 120 is shown being nailed to a roof R by nails 119 being applied through overlay band 126.

The anterior shingle layer 120 is shown with lighter granules 129 on its upper surface. Near the end 123 of the shingle that will not be exposed in the installed condition of the shingle 120 when laid up on a roof, it will be seen that a protruding portion 124 of the posterior shingle layer 121 extends beyond the end 125 of the anterior shingle layer 122. Also, proximate the end 123 of the shingle 120 and remote from its opposite end 123' an overlay 126 comprised of granules 127 over an adhesive 128 is shown, extending the thickness T of the shingle, as shown, to yield a thicker-appearing shingle as viewed in the installed condition (FIG. 8). It will be noted that the adhesive 128 is that applied in a thin band, via a roller 71 or 72 as described above, and that the granules 127 are those applied via a granule applicator such as the applicators 84 or 85, as described above.

The posterior and anterior shingle layers 121, 122, are constructed as described above, each having a mat layer 130 impregnated above and below with adhesive layers 131, 132, with granules 133 on the adhesive layer 131 and with smaller particles 134 such as sand, mica or the like beneath the adhesive layer 132. Except perhaps for the color or shading of granules, each of the anterior and posterior shingle layers 122, 121, are similarly constructed.

A shadow line or band 135, of darker granules is provided, just to the left of the overlay 126, as shown in FIG. 7. The overlay 126, while preferably being comprised of somewhat darker granules than the major upper surface of the anterior shingle layer 122, is spaced from the protruding portion 124 of the posterior shingle layer 121, by a portion 136 of the upper surface of the anterior shingle layer, as shown at the upper end of FIG. 6. Alternatively, the overlay 126 could extend farther to the right than is shown in FIG. 7, for example, to the edge 125 of the anterior layer 122. However, in some embodiments, the "stepping" effect of the layer "feathering out" that would be achieved as shown in the illustration of FIG. 7 such that the height of overlapping shingles as shown in FIG. 8 would be more gradual, would allow the overlapped shingles as shown in FIG. 8 to conform more smoothly to the roof.

In FIG. 6A, a hip, ridge or rake shingle 120A is illustrated, constructed similar to the shingle of FIG. 6, but wherein the shingle 120A is of single layer thickness, as distinguished from a laminated shingle, but having a shortened headlap and the features 126A, 135A and 136A, corresponding to features 126, 135 and 136 of the shingle of FIG. 6. In FIG. 6A the shingle is shown being nailed to a roof RA by nails 119A being applied through overlay band 126A.

Referring now to FIG. 6B, it will be seen that the shingle 120B is a field shingle, as distinguished from a hip, ridge or rake shingle, is of a single layer thickness only, like the shingle of FIG. 6A, and likewise has a shortened headlap and the features 126B, 135B and 136B corresponding to the respective features 126, 135 and 136 of the shingle of FIG. 6. In FIG. 6B the shingle is shown being nailed to a roof RB by nails 119B being applied through overlay band 126B.

With reference now to FIG. 6C, a double-layer laminated shingle 120C is shown, which is a field shingle having a shortened headlap, also with features 126C, 135C and 136C corresponding to the respective features 126, 135 and 136 of the shingle of FIG. 6, having its respective anterior and posterior laminated layers 122C and 121C likewise corresponding to respective layers 122 and 121 of FIG. 6. In FIG. 6C the shingle is shown being applied to a roof RC by nails 119C being applied through overlay band 126C. With reference to FIGS. 6B and 6C, it will be understood that field shingles of the invention may include a full size conventional headlap (shown in phantom as an alternative) such that the upper portion (headlap) of a shingle above the exposure zone (tab portion) 129B, 135B or 129C, 135C extends sufficiently high that the upper end 123B or 123C underlies the exposure zone of the superadjacent course and the lower end 123B', 123C' of a second overlying course (also shown in phantom, as an alternative) to provide a full shingled overlapping effect. Such shingles each have a tab portion of a height that is a multiple of the height of the headlap portion; such multiple being either greater than one or less than one.

Referring now to FIGS. 8 and 9, it will be seen that an array of a plurality of three shingles 120, 120' and 120" of the type illustrated in FIG. 6 are shown, in overlapping relation to each other as they would appear on a roof. With specific reference to the zone 140 where adjacent shingles 120 and 120' overlap, and specifically with reference to the enlargement 141 thereof shown in FIG. 9, what one sees in FIG. 9, is the upper surface of the anterior shingle layer 120', with a shadow line 135 disposed thereon, and then one would see the edge of the thickened overlay 126 contributing to the overall thickness T for the shingle 120', that is discussed for FIG. 7. Also, for successive overlapped shingles, such as those 120 and 120' shown in FIG. 8, it will be seen that the protruding portion 124 of the posterior shingle layer 121 will allow an overlying portion of a next adjacent shingle, for example that 120, to more gradually overly the end 123 of a next-underlying shingle 120', providing a more feathered overlap, rather than an abrupt overlap for an overlying portion of the shingle 120 relative to the underlying shingle 120', contributing to the aesthetic effect, and also with the protruding portion 124 of the posterior layer of the underlying shingle providing some underlying support that can be beneficial in resisting shingle breakage, as for example, if one were to step on an overlying hip, ridge or rake shingle near an edge of that shingle where it overlies a next underlying shingle.

With reference now to FIG. 8B, it will be seen that the shingle 120" has two layers 121' and 122'. In addition to the overlay 135', it will be seen that there is optionally provided a plurality of bands of overlay 126, between overlying shingle 120' and next-underlying shingle 120", in the headlap zone of shingle 120", unexposed in the installed condition, with the plurality of bands 126 of overlay being covered by a layer of preferably asphalt-based adhesive 129, carried beneath shingle 120', for providing a plurality of bands of overlay to serve as a contact zone for the adhesive 129 and as multiple targets for nailing or otherwise fastening, and to provide a plurality of water barriers against inflow of water between overlying and next-underlying shingles. Where multiple overlays 126 are provided, one or more may be continuous, and one or more may be discontinuous, such that at least one band of overlay provides a water barrier against inflow of water. The overlay 135' can be upstanding, as shown, or could be part of the layer 122' (not shown) and not protruding above the upper surface of the layer 122'

With reference to FIGS. 8A and 9A, an array of a plurality of three shingles 120A, 120A' and 120A", are provided corresponding respectively to the shingles 120, 120' and 120" of FIGS. 8 and 9, but differing from the shingles of FIGS. 8 and 9 in that the shingles of FIGS. 8A and 9A are of single layer thickness, as distinguished from being laminated shingles shown in FIGS. 8 and 9. With respect to FIG. 9A, the features 120A', 121A, 122A, 126A, 135A and 141A correspond respectively to the features 120', 121, 122, 126, 135 and 141 of FIG. 9.

With reference now to FIG. 8C, in addition to the overlay 135A, it will be seen that there is optionally provided a plurality of bands of overlay 126A, between overlying shingle 120A' and next-underlying shingle 120A", in the headlap zone of shingle 120A", unexposed in the installed condition, with the plurality of bands 126A of overlay being covered by a layer of preferably asphalt-based adhesive 129A, carried beneath shingle 120A', for providing a plurality of bands of overlay to serve as a contact zone for the adhesive 129A and as multiple targets for nailing or otherwise fastening, and to provide a plurality of water barriers against inflow of water between overlying and next-underlying shingles. Where multiple overlays 126A are provided, one or more may be continuous, and one or more may be discontinuous, such that at least one band of overlay provides a water barrier against inflow of water.

With reference to FIG. 10, a strip 150 is presented of three connected laminated hip, ridge or rake shingles 151, 152 and 153, with their anterior shingle layers being completely severed at 154 and 155, and with their posterior shingle layers being incompletely severed as discussed above with reference to the transverse severance mechanism discussed relating to FIG. 4 above, with zones 156 of adhesive being shown in phantom connecting the anterior and posterior layers of shingle material together. Shadow lines 135, overlays 126, narrow anterior portions 136, and protruding portions 124 of the posterior shingle layers, all as have been discussed above with respect to FIGS. 6 and 7 also appear on the connected together shingles of FIG. 10. It will be understood that, if desired, it could, as an alternative, be the posterior shingle layer that is completely severed by means of a mechanism such as that of FIG. 4, or both posterior and anterior shingle layers could be incompletely severed, as may be desired. Also, it will be apparent that only two adjacent shingles could be connected together, if desired, rather than the three shown in FIG. 10, or that four or more could be connected together, as may be desired.

FIG. 11 is an illustration like that of FIG. 10, differing therefrom only in that the overlay strips 126 shown in FIG. 10 could, if desired, be comprised of a plurality of discontinuous zones 126' of overlay, each being made up of a zone of adhesive with the layer of granules applied thereto, as may be desired. Such provides a discontinuous, or staggered thickness effect having a different aesthetic than that shown for the illustration of FIG. 10. Such may also provide a greater ease of bendability of the shingle for installation, folded over a hip, ridge or rake, as well as providing a mechanical flexibility along the fold direction.

In some embodiments, a portion of the discontinuity between discontinuous zones 126' could be at the mid-line of the shingle, such as where the bend occurs in FIG. 8, which may facilitate bending of the shingles in the approximate shapes shown in FIG. 8, at the desired location where bendability is best facilitated; namely, at the apex of the bend which would be between some spaced-apart overlays.

FIG. 12 shows three adjacent and virtually identical hip, ridge or shake shingles 160, completely severed, as for example, may be made by passing between a pair of rollers 106, 107, each with continuous cutters 108 or 110 thereon, or a single continuous cutter 108 on one roller, operating against an anvil roller, for completely severing through the shingles. Otherwise, the shingles of FIG. 12 appear the same as those of FIG. 10, although, if desired, they could appear to be the same as those of FIG. 11, if spaced-apart overlay zones are desired. It will be understood that the process as described for FIGS. 1, 1A, 2 and 2A to produce either completely separated shingles as shown in FIG. 12, or to produce incompletely severed shingles as illustrated in FIG. 10, separated completely every few shingles, and/or to produce discontinuous overlay zones 126' as shown in FIG. 11 could all be synchronized, such that the cutting that is effected by any of the rollers illustrated in FIGS. 3, 4, 4A, 5 and 5A, or that is effected by controlling adhesive applications or by controlling granule drops, can all be controlled in a synchronized manner, if desired, for example, in accordance with one or more of U.S. patent publication 2006/0260731 and U.S. Pat. No. 6,467, 235, the complete disclosures of which are herein incorporated by reference.

Alternatively, adhesive bands with release strips could be disposed on tops or bottoms of shingles in a stack such that the configuration of a stack of shingles would be to have the adhesive bands and release strips in alignment, rather than staggered as shown in FIG. 15.

As an alternative to the partial or fully separated shingles discussed above with reference to FIGS. 10-12, the cutting between adjacent shingles could be complete in those portions of the shingles that would be exposed in the installed condition, and the remainder of the adjacent shingles could still be connected, such as by being partially perforated in the headlap portion of those shingles that would not be visible in the installed condition. Thus, for packaging purposes, the shingles could still be connected, but such an arrangement would yield a cleaner cut in those parts of the shingles that would be visible in the installed condition on a roof, and the efficiency of connected-together shingles would still exist for purposes of transport and handling.

In the case of a single layer shingle, as distinguished from a laminated shingle, the illustrations of the single layer thickness shingle would be similar to FIGS. 10-12, except that there being no posterior layer, there would be no protruding portion 124, nor the need for an adhesive 156.

With respect to the illustrations of FIGS. 6, 6A, 6B, 6C, 8, 8A, 8B, 8C, 10, 11 and 12, it will be noted that these shingles have a shortened headlap portion; i.e., that portion of each of the shingles that is above the overlay 126, 126A, 126B and 126C, which headlap portion is covered when the shingles are arranged on a roof in an array, by a tab portion of a next-overlying shingle, as shown, for example in FIGS. 8 and 8A. It will be noted that the headlap portions of each of the above-mentioned shingles have a width, from their overlay, to their upper ends, that is a small portion of the total width of each of the shingles, from top to bottom. That is, the tab portions of each of these shingles are of a width from top to bottom that is a multiple of the width of each of the shingle's headlap portion.

With reference now to FIG. 13, it will be seen that a plurality of strips 150 of three connected-together shingles, in flattened form, may be packaged together, by wrapping the same by means of any conventional paper, plastic, or cardboard wrapper 170, for ease of handling and/or shipment. It will be noted that in the illustration of FIG. 13, the shingles in the stack are alternated, some facing downwardly and others facing upwardly, as may be desired, so that the overlays of the various shingles are not all vertically aligned in the stack, as shown. However, there are many possible variations as to how the shingles in a given stack may be arranged, with the illustration of FIG. 13 being by way of example, only.

With reference now to FIG. 14, it will be seen that a plurality of shingles 160, of the type illustrated in FIG. 12, are shown stacked alternately, face up or face down, with a wrapping 180, shown in phantom, for wrapping about the stack shown in FIG. 14, for ease of handling and/or shipment, as may be desired.

Referring now to FIG. 15, another package 190 of shingles is provided, in which a plurality of laminated shingles 191 are provided in a stack, with a wrapping 189 being shown in phantom applied thereover.

It will be understood that in the end view as shown in FIG. 15, the shingles could be any of those shown in either FIG. 13 or 14, as may be desired.

In the arrangement of illustration of FIG. 15, each of the shingles 191 is shown packaged back-to-back with adjacent shingles, with each comprising an anterior shingle layer 192, a posterior shingle layer 193, laminated together by means of a suitable adhesive (not shown), and with an overlay 194 of granules adhered to an upper surface of the anterior shingle layer 192, and secured thereto by means of an overlay adhesive (not shown). The overlay 194 may be comprised of granules as has been discussed above with respect to the various embodiments.

A strip of adhesive 195 is shown on the bottom surface 196 of the posterior shingle layer 193, near an end 197 of the shingle 191 that would be the weather-exposed end of the shingle 191, in the installed condition on a roof. A layer of release material 198, is shown, carried by a next-underlying shingle in the stack illustrated in FIG. 15, but located so that it is disposed against the adhesive 195 of the next-overlying shingle in a stack, when the shingles are arranged in the stack in a back-to-back manner as illustrated in FIG. 15. It will be understood that such an arrangement prevents shingles having an adhesive strip 195 thereon from becoming stuck to a next-adjacent shingle, so that when the shingles are separated from the stack illustrated in FIG. 15, they will not be stuck together. Alternatively, the adhesive strips and release material could be disposed on tops or bottoms of the shingles in alignment in the stack, if desired.

With reference to FIG. 15A, a package 190A of shingles 191A is shown, wherein the shingles 191A are single layer shingles as distinguished from the laminated shingles 191 of FIG. 15, wherein the shingles of FIG. 15A have corresponding features 194A, 195A, 196A, 197A and 198A, to those similar features for the laminated shingles of FIG. 15, having features 194, 195, 196, 197 and 198.

It will thus be seen that the present invention provides a thick-appearing hip, ridge and/or rake shingle that is efficient in its use of material, allowing for the making of shingles on a single manufacturing line, whereby a single sheet of impregnated shingle material can simultaneously make both posterior and anterior shingle layers, and that after the shingle layers are brought together and laminated, a pair of adjacent laminated shingles can be made simultaneously, by cutting transversely, and, as the laminated shingle material is moved longitudinally, the shingles can be cut to pairs of laminated shingles with overlays thereon, either completely cut through, or incompletely cut through, for handling and packaging purposes, as may be desired.

The addition of a shadow line to the upper surface of the shingle that is weather-exposed in the installed condition, gives the appearance of even greater thickness, and provides a custom look, as may be desired. During the installation, the amount of shadow line or overlay that is exposed from an underlying shingle, relative to a portion of a next-overlying shingle, can be selected by the installer for desired aesthetic effect.

In some embodiments, the granules in the zone or band 62' are selected to match or be complementary to the granules that are on the field shingles with which the hip, ridge or rake shingles to be applied. For example, the granules in the zone or band 62' could be selected to provide a transition zone in color or appearance, or to provide a variegated effect relative to the granules of the field shingles. Such variations could be applied in a transverse direction or a longitudinal direction, or both, as may be desired.

It will thus be seen that, in accordance with this invention, the overlay lines or bands 126, 126A, 126B, 126C, of either field shingles or of hip, ridge or rake shingles provide a target zone for the nailing or otherwise fastening (for example by means of staples or the like) the shingles to a roof, irrespective of whether they are field shingles or hip, ridge or rake shingles, in that such bands 126, 126A, 126B, 126C are in the non-exposed headlap zones of the shingles that are covered in the installed condition of shingles on a roof, in that a next-overlying shingle will have its tab portion covering such non-exposed bands of next-underlying shingles, with the installer nailing or otherwise fastening through the thicker overlay portion of the shingle, using that portion of the shingle as the fastener location. The overlay bands or lines also provide a water barrier for preventing water from entering beneath lower tab portions of next-overlying shingles, in the direction of arrows W shown in FIG. 8, or in the direction of arrows WA shown in FIG. 8A, in the case of wind-driven rain contacting a roof.

It will also be seen that the shortened headlap portion of each of the shingles 136, 136A, 136B and 136C will enable material savings by having a reduced height in such non-exposed portions of the shingles. Such shortened headlaps enable the shingles to be thicker at the location of overlap because of the overlay, whether they are single thickness shingles or laminated shingles, yet producing material savings due to the shortened headlap.

Additionally, the overlay that is applied to the shingle can be provided in a variety of thicknesses or in a plurality of different bands of overlay, to provide multiple targets for fastening shingles to a roof via nails or other fasteners, as well as providing multiple water barriers.

Additionally, sealant adhesive applied to an undersurface of a shingle can be located so as to overly the raised overlay or multiple overlays as illustrated and described for FIGS. 8B and 8C, thereby enhancing the water barrier. The overlay may be comprised of an adhesive, preferably an asphalt or other bitumen product, that can be a modified, or non-modified asphalt. If it is a modified asphalt, it can be made in accordance with U.S. Pat. No. 5,347,785, the complete disclosure of which is herein incorporated by reference. In cases where the overlay is to be bent, it may be desirable to have the same be discontinuous as shown in FIG. 11, to facilitate bending, although the same would provide a discontinuous water barrier, while providing a plurality of targets for fastener locations. The addition of the shadow lines as described herein can aesthetically provide the appearance of even greater shingle thickness. Shingles in accordance with this invention can be packaged as disclosed in FIGS. 13-15 and 15A, enabling the use of online packaging and laminating techniques.

Instead of various ones of the process features in accordance with this invention discussed above, either by way of variations in application of adhesive, or variations in the depositing of granules, it will be understood that various features known in the art may be used instead of some of the detailed features discussed above with respect to this invention. For example, such features as are disclosed in U.S. Pat. Nos. 4,352,837 to Kopenhaver, or 6,355,132 to Beck et al or 6,044,608 to Stahl et al, may be used, as alternatives, and the complete disclosures of these patents are herein incorporated by reference.

It will be understood that variations can be made in the manner of construction, as well as in the amount of overlay and/or shadow line, and that variations can be made in the coloration and/or darkness of the various granules applied to different portions of the shingle, all within the spirit and scope of the invention as defined in the appended claims

What is claimed is:

1. A shingle comprising a tab portion adapted to be exposed when installed on a roof and a headlap portion adapted to be unexposed when installed on a roof, and including an adhesive impregnated mat with upper and lower surfaces, with granules on the upper surface, and including at least one overlay of granule covered adhesive comprising a narrow band along the upper surface of the headlap portion creating a thicker portion along the shingle than the rest of the shingle, wherein granules on said upper surface are beneath said overlay, with the overlay comprising any one of:
   (a) means providing a fastening zone for receiving fasteners therethrough, for fastening the shingle to a roof; and
   (b) means providing a contact zone for adhesive of an overlying tab portion of a next-overlying shingle when the shingle is installed on a roof, for forming a water barrier against water entering between overlying and next-underlying shingles at the location of said overlay.

2. The shingle of claim 1, wherein the shingle has a tab portion that is of a height that is a multiple of the height of the headlap portion; and wherein the multiple is any one of:
   (a) greater than 1; and
   (b) less than 1.

3. The shingle of claim 1, wherein the at least one overlay comprises both the fastening zone and the contact zone of claim 1.

4. The shingle of claim 1, wherein the shingle comprises a multi-layer laminated shingle.

5. The shingle of claim 1, wherein the shingle comprises a field shingle.

6. The shingle of claim 1, wherein the shingle comprises hip, ridge or rake shingle.

7. An array of shingle according to claim 1 laid up on a roof, with next-overlying shingles having tab portions overlying headlap portions of next-underlying shingles and with fasteners applied through the overlays, fastening the shingles to a roof.

8. The array of shingles of claim 7, with adhesive strips carried beneath tab portions of next-overlaying shingles, covering and adhered to the overlays of next-underlying shingles, with the adhesive strips and the overlays comprising water barriers to water entering between next-overlying and next-underlying shingles.

9. The array of shingles of claim 8, wherein the shingles comprise multi-layer laminated shingles.

10. The array of shingles of claim 8, wherein the shingles comprise field shingles.

11. The array of shingles of claim 8, wherein the shingles comprise hip, ridge or rake shingles.

12. The array of shingles of claim 7, wherein the shingles comprise multi-layer laminated shingles.

13. The array of shingles of claim 7, wherein the shingles comprise field shingles.

14. The array of shingles of claim 7, wherein the shingles comprise hip, ridge or rake shingles.

15. The array of shingles of claim 7, wherein the overlays are continuous across the headlap portions of the shingles.

16. The array of shingles of claim 7, wherein the overlays are discontinuous across the headlap portions of the shingles.

* * * * *